(12) United States Patent
Koopmans et al.

(10) Patent No.: US 7,524,419 B2
(45) Date of Patent: Apr. 28, 2009

(54) MIXER FOR USE WITH MEDIA IN WASTEWATER TREATMENT

(76) Inventors: Richard J. Koopmans, 15035 SE. 46th St., Bellevue, WA (US) 98006-2568; Kristinn G. Drewry, 15035 SE. 46th St., Bellevue, WA (US) 98006-2568

( * ) Notice: Subject to any disclaimer, the term of this patent is extended or adjusted under 35 U.S.C. 154(b) by 275 days.

(21) Appl. No.: 11/433,700

(22) Filed: May 12, 2006

(65) Prior Publication Data

US 2006/0254977 A1 Nov. 16, 2006

Related U.S. Application Data

(60) Provisional application No. 60/681,718, filed on May 16, 2005.

(51) Int. Cl.
*C02F 3/30* (2006.01)
*C02F 3/06* (2006.01)

(52) U.S. Cl. .............. 210/605; 210/615; 210/630; 210/150; 210/221.2; 210/259

(58) Field of Classification Search ............. 210/605, 210/615–617, 630, 150, 151, 252, 259, 220, 210/221.2
See application file for complete search history.

(56) References Cited

U.S. PATENT DOCUMENTS

| | | | |
|---|---|---|---|
| 4,595,296 A | | 6/1986 | Parks |
| 5,298,164 A * | | 3/1994 | Hapach et al. .............. 210/604 |
| 5,959,938 A * | | 9/1999 | Behrens ........................ 367/15 |
| 6,015,497 A * | | 1/2000 | Steen, Jr. .................... 210/618 |
| 6,183,643 B1 * | | 2/2001 | Goodley ..................... 210/605 |
| 6,280,636 B1 | | 8/2001 | Locklair |
| 6,372,140 B2 | | 4/2002 | Kelly |
| 6,616,843 B1 * | | 9/2003 | Behmann et al. ............ 210/605 |
| 6,629,773 B2 | | 10/2003 | Parks |
| 6,692,642 B2 * | | 2/2004 | Josse et al. ................. 210/605 |
| 6,896,804 B2 | | 5/2005 | Haerther et al. |
| 7,005,068 B2 | | 2/2006 | Hoffland |
| 7,282,141 B2 | | 10/2007 | Koopmans et al. |
| 7,374,675 B2 | | 5/2008 | Koopmans et al. |
| 2006/0070948 A1 | | 4/2006 | Wickham |
| 2006/0081534 A1 | | 4/2006 | Dimitriou et al. |
| 2006/0086662 A1 | | 4/2006 | Ogden |
| 2006/0096918 A1 | | 5/2006 | Semmens |
| 2006/0124543 A1 | | 6/2006 | Pehrson et al. |

FOREIGN PATENT DOCUMENTS

JP 07-203806 * 8/1995
WO PCT/US2004/011248 10/2004

* cited by examiner

*Primary Examiner*—Fred Prince
(74) *Attorney, Agent, or Firm*—Anthony Claiborne (57) ABSTRACT

A system for wastewater treatment comprises a tank and includes a mixer that generates large mixing bubbles, for example a bubble having a largest dimension of 6 inches to 10 feet. In some embodiments, the mixer is located in the anoxic zone. The mixing bubbles are large enough to move wastewater as they rise to the surface and generate a mixing current in the wastewater. The mixing current mixes the wastewater, and bacteria and other microorganisms to promote the bacteria and other microorganisms' conversion of the pollutants contained in the wastewater. The system further comprises an Integrated Fixed-film Activating Sludge (IFAS) system.

8 Claims, 7 Drawing Sheets

MIXER FOR USE WITH MEDIA IN WASTEWATER TREATMENT

CROSS REFERENCE TO RELATED APPLICATION

This application claims priority from U.S. provisional application No. 60/681,718, filed May 16, 2005, entitled MIXER FOR USE IN WASTEWATER TREATMENT PROCESSES.

BACKGROUND

Water is frequently used to transport unwanted materials—waste—to a facility where the waste is removed or neutralized in the water. For example, water carries most sewage and industrial waste, such as chemicals, in the form of wastewater to a treatment facility where the water is treated and then returned to the environment for future use. The wastewater treatment process typically includes three general phases. The first phase, or primary treatment, involves mechanically separating the dense solids in the wastewater from the less dense solids and liquid in the wastewater. This is typically done in sedimentation tanks with the help of gravity. The second phase, or secondary treatment, involves the biological conversion of carbonaceous and nutrient material in the wastewater to more environmentally friendly forms. This is typically done by promoting the consumption of the carbonaceous and nutrient material by bacteria and other types of beneficial organisms already present in the wastewater or mixed into the wastewater. The third phase, or tertiary treatment, involves removing the remaining pollutant material from the wastewater. This is typically done by filtration and/or the addition of chemicals and/or UV light and/or Ozone to neutralize harmful organisms and/or remove pollutant material.

The second phase of the wastewater treatment process typically includes an aerobic—with oxygen—portion in which bacterial and other microorganisms are provided dissolved oxygen to promote their consumption of the carbonaceous and nutrient materials, and an anoxic—oxygen from a nitrate/nitrite source—portion in which the bacteria and other microorganisms use the oxygen in the nitrate/nitrite for their metabolic functions. The second phase may also include an anaerobic—without oxygen—portion in which bacteria and other microorganisms metabolically function without oxygen. The aerobic, anoxic and anaerobic portions are typically carried out in tanks that are divided into aerobic, anoxic and anaerobic zones: The tank may include one zone in which the aerobic portion operates and one in which the anoxic portion operates and one in which the anaerobic portion operates, or the tank may include any combination of any number of these zones. In some applications, a tank may be solely dedicated to one of the three aerobic, anoxic and anaerobic portions.

In the aerobic process, wastewater that includes ammonium ($NH_4$) and organic waste containing nitrogen, for example urea ($(NH_2)_2CO$), enters the aerobic zone. In the presence of dissolved oxygen ($O_2$), bacteria and other microorganisms convert the ammonium into nitrate ($NO_3$) via nitrite ($NO_2$). The nitrate can then be anoxically processed into nitrogen gas ($N_2$), which is harmless in the environment. In the aerobic process, a blower and diffusers supply the dissolved oxygen to the wastewater. The blower provides air to the diffusers, and the diffusers generate and release tiny bubbles so that oxygen in the bubbles will dissolve in the wastewater. As the aerobic process progresses, the amount of ammonium in the wastewater decreases while the amount of nitrate and dissolved oxygen increases. The amount of dissolved oxygen increases because the demand for the dissolved oxygen decreases as the amount of nitrate increases. After most of the ammonium has been converted into nitrate, the wastewater is ready to be anoxically processed.

In the anoxic process, wastewater that includes nitrate and the organic waste containing nitrogen enters the anoxic zone. In the absence of dissolved oxygen, bacteria and other microorganisms convert the nitrate into nitrogen gas and the organic waste containing nitrogen into ammonium. As the anoxic process progresses, the amount of nitrate decreases and the amount of ammonium increases. After most of the nitrate has been converted into nitrogen gas, the wastewater is ready to be aerobically processed or treated in the tertiary treatment phase.

Mixing the contents in each of the aerobic and anoxic zones promotes the conversion reactions in each zone by increasing the contact of the components, such as the dissolved oxygen (aerobic zone), nitrite/nitrate (anoxic zone), wastewater, and bacteria and other microorganisms, with the other components in each zone.

Further to promote the conversion reactions in at least some of the zones, an Integrated Fixed-film Activating Sludge (IFAS) system that includes media may be employed. As typified by the AccuPac® cross-flow media product of Brentwood Industries, Inc. of Reading, Pa., such media are freely suspended in the wastewater and provide bacteria and other microorganisms a structure to hold onto. In other cases (such as the BioWeb™ media product from Entex, Inc. of Chapel Hill, N.C.), the IFAS may include a net or web that is anchored in the zone to provide bacteria and other microorganisms a structure to hold onto. In still other embodiments the IFAS may include both the net or web and the media. In any case, when IFAS is employed effectively in a treatment zone, the IFAS material is typically deployed widely throughout the zone to present a large surface area for biological conversion of the wastewater.

In the prior art, wastewater in the aerobic zone is typically mixed by the movement of the tiny bubbles injected by diffuser and further mixed by a mechanical mixer that includes a screw or blade that is turned by a motor. In the anoxic zone, the prior art typically employs a mechanical mixer alone for mixing, the tiny bubbles diffused in the aerobic stage being neither needed nor typically supplied in the anoxic stage.

The prior art means for mixing the wastewater in the aerobic and anoxic zones is subject to limitations and disadvantages. Mixing the aerobic zone with the movement of the tiny bubbles through the wastewater requires a substantial amount of tiny bubbles to be injected into the wastewater to sufficiently mix the wastewater. As the demand for dissolved oxygen diminishes with aerobic treatment over time, the amount of tiny bubbles that must be supplied to provide adequate mixing will greatly exceed the quantity of tiny bubbles required for sufficient oxygenation. Using the tiny bubbles for mixing when wastewater oxygen demand has diminished, the diffusers consume more power than required to oxygenate the wastewater and can inject more dissolved oxygen into the aerobic zone than required, in fact thereby potentially slowing the progress of the wastewater treatment.

Mixing the aerobic and anoxic zones with a mechanical mixer consumes a large amount of power relative to the amount of wastewater that it mixes, and often mixes some, but not all, of the wastewater in each zone. Thus, some of the sludge in the aerobic and anoxic zones remains on the bottom of the tank after it settles there. In the aerobic zone, the settled sludge can plug some of the diffusers. This can reduce the amount of dissolved oxygen injected into the wastewater, and thus requires one to clear the plugged diffusers.

In an improvement on the prior art, a tank for treating wastewater includes an aerobic zone in which bacteria and other microorganisms consume pollutants in the presence of dissolved oxygen, and an anoxic zone in which bacteria and other microorganisms convert pollutants in the absence of dissolved oxygen to a more environmentally friendly form. Advantageously, the tank also includes a mixer that generates large mixing bubbles, for example a bubble having a largest dimension of 6 inches to 10 feet. The mixing bubbles are large enough to move wastewater as they rise to the surface and generate a mixing current in the wastewater. The mixing current mixes the wastewater, and bacteria and other microorganisms to promote the bacteria and other microorganisms' conversion of the pollutants contained in the wastewater.

Because the mixing bubbles are large enough that the amount of oxygen that they release into the wastewater as they move through it is negligible, when large bubbles are used for mixing in the anoxic zone, the zone remains anoxic as the large bubbles from the mixer rise toward the surface of the wastewater. Accordingly, large bubbles can be used for advantageously for mixing in both the aerobic and anoxic zones.

It may appear even to those skilled in the art that the presence of IFAS in such a wastewater treatment system would present a physical barrier, whereby large mixing bubbles are broken up with the consequent loss of the advantages afforded by employing such bubbles for mixing. However, the inventors hereof have discovered that large bubbles may advantageously be used for mixing wastewater in both aerobic and anoxic zones even when IFAS is present.

BRIEF SUMMARY OF THE INVENTION

Embodiments of the present invention comprise a tank for treating wastewater and include an aerobic zone in which bacteria and other microorganisms consume pollutants in the presence of dissolved oxygen, and an anoxic zone in which bacteria and other microorganisms convert pollutants in the absence of dissolved oxygen to a more environmentally friendly form. Advantageously, the tank also includes a mixer that generates large mixing bubbles, for example a bubble having a largest dimension of 6 inches to 10 feet. In some embodiments, the mixer is located in the anoxic zone. The mixing bubbles are large enough to move wastewater as they rise to the surface and generate a mixing current in the wastewater. The mixing current mixes the wastewater, and bacteria and other microorganisms to promote the bacteria and other microorganisms' conversion of the pollutants contained in the wastewater. The present invention advantageously further comprises an Integrated Fixed-film Activating Sludge (IFAS) system, enhancing the efficiency of wastewater conversion.

BRIEF DESCRIPTION OF THE DRAWINGS

The foregoing objects, as well as further objects, advantages, features and characteristics of the present invention, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE PREFERRED EMBODIMENTS

Figure 1:
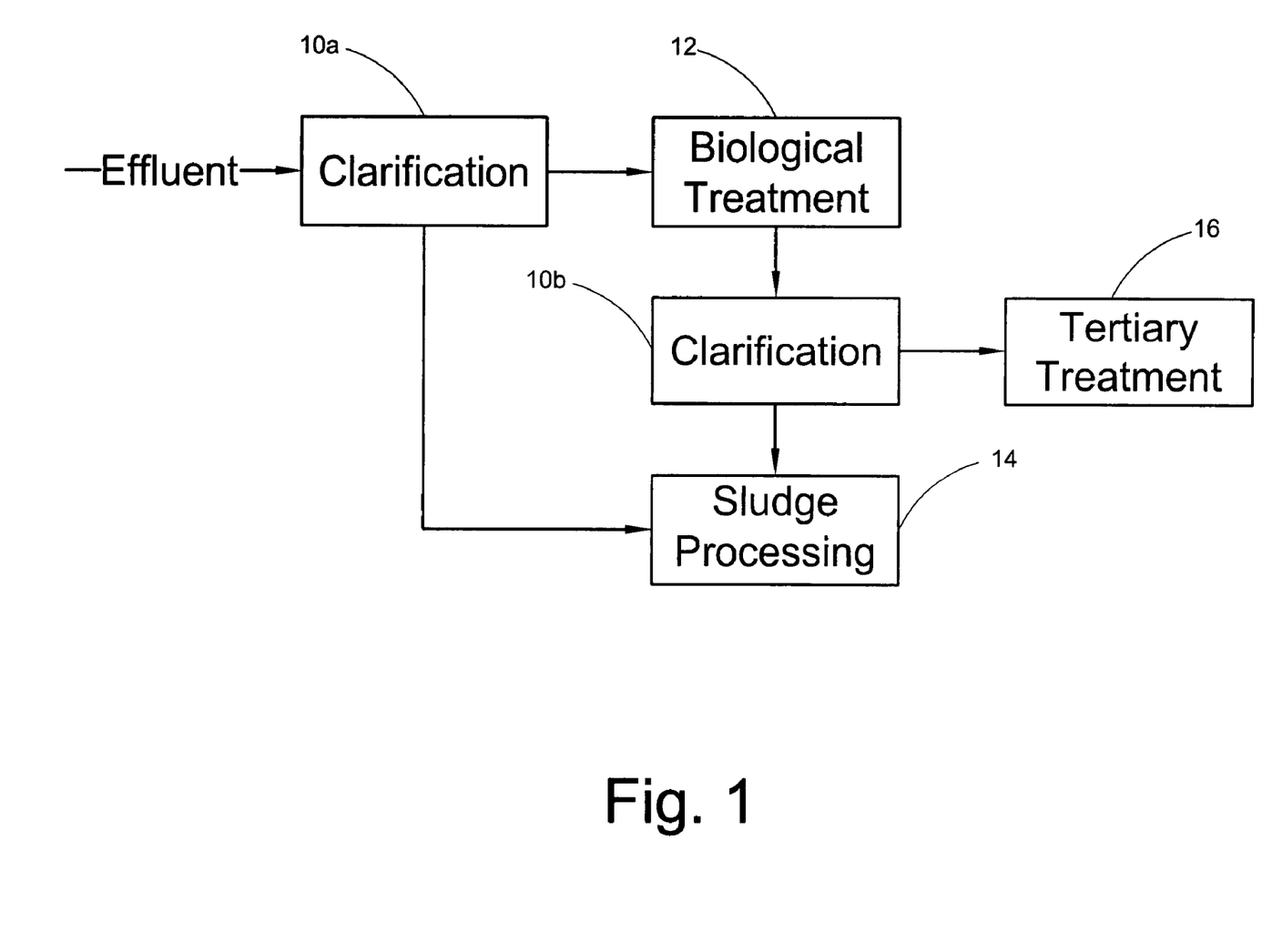
FIG. 1 is a schematic diagram of a typical wastewater treatment plant that includes a primary treatment process, a secondary treatment process, a tertiary treatment process, and a waste sludge treatment process.

FIG. 1 is a schematic diagram of a wastewater treatment process that includes a primary treatment process, a secondary treatment process and a tertiary treatment process. The primary treatment process includes a clarification stage 10a to separate dense portions of the wastewater, typically heavy solids, from less dense portions of the wastewater, typically light solids and liquid. The secondary treatment process includes a biological nutrient conversion stage 12 that converts the biological nutrient material contained in the light solids and liquid into a more environmentally friendly form. For example, in one embodiment, wastewater is first clarified into heavy solids, light solids and supernatant liquid in the clarification stage 10a using conventional techniques. The heavy solids are directed to a sludge processing stage 14 that processes the heavy solids using conventional techniques. The light solids and liquid are directed to the biological nutrient conversion stage 12 where they are subject to an aerobic, or an aerobic and an anoxic conversion process as discussed in greater detail in conjunction with FIGS. 2 through 4. During the biological nutrient conversion stage 12, the bacteria and other microorganisms convert the nutrient material contained in the wastewater to a form that is more environmentally friendly. From the biological nutrient conversion stage 12, the wastewater is directed to another clarification stage 10b that clarifies the liquid and any remaining heavy and light solids using conventional techniques. From the clarification stage 10b, the heavy sludge, which contains a predominance of bacteria, is partially directed to the sludge processing stage 14 that processes the heavy solids using conventional techniques and partially returned to the secondary treatment stage. The very light solids and liquid that does not contain excessive amounts of biologically nutrient material is directed to the tertiary treatment process 16 where remaining pollutant material is removed from the wastewater.

Figure 2:
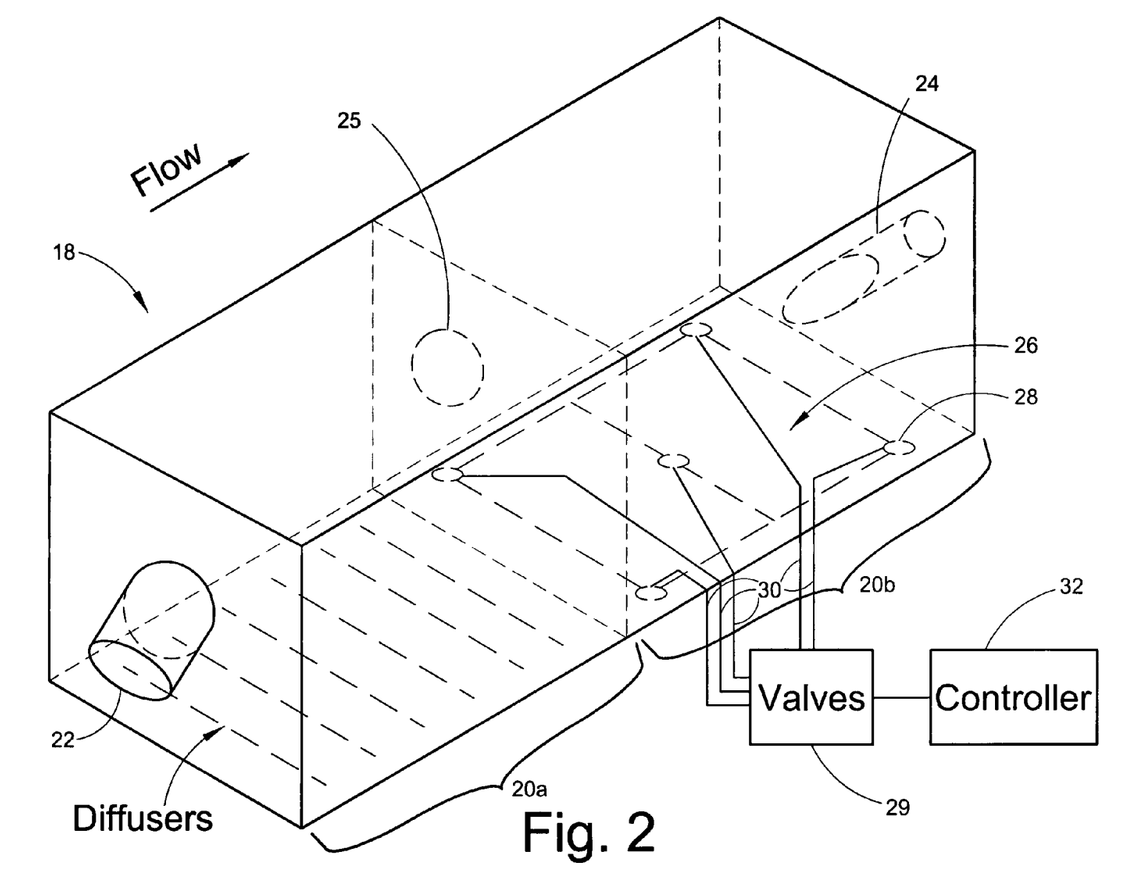
FIG. 2 is a perspective view of a tank that includes a zone in which an anoxic portion of a secondary biological treatment process is performed and a mixer located in the zone, according to an embodiment of the invention.

FIG. 2 is a perspective view of a tank 18 in which a secondary treatment process is performed, according to an embodiment of the invention. The tank 18 includes zones 20a and 20b in which bacteria and other microorganisms aerobically and anoxically consume and convert pollutants including nutrients contained in the wastewater. Although depicted tank 18 includes anoxic and aerobic zones 20a and 20b, as is understood by those of skill in the art the tank 18 may include one or more anoxic zones 20b, and not include an aerobic zone 20a.

In the depicted embodiment, the tank 18 includes two zones 20a and 20b, an inlet 22 through which wastewater enters the tank 18, an outlet 24 through which wastewater exits the tank 18 after flowing through the zones 20a and 20b, and a portal 25 through which the wastewater leaves the zone 20a and enters the zone 20b. The zone 20a includes bacteria and other microorganisms (not shown) that aerobically consume pollutants in the wastewater, and the zone 20b includes bacteria and other microorganisms (not shown) that anoxically convert pollutants in the wastewater. Located in the zone 20b of the tank 18, a mixer 26 injects any fluid, such as air, that is less dense than the combination of the wastewater, bacteria and other microorganisms to generate large mixing bubbles (shown in FIG. 4). The mixing bubbles are large enough to move a substantial amount wastewater as they rise toward the wastewater's surface, and thus generate a mixing current (shown in FIG. 4) in the wastewater. The mixing current mixes the wastewater, bacteria and other microorganisms to promote biological activity for removal of pollutants from the wastewater.

The mixer 26 includes a forming plate 28 to form mixing bubbles from the injected fluid, and a valve 29 to permit or prevent the fluid from reaching the forming plate 28. The mixer 26 also includes a distribution line 30 to supply the forming plate 28 with the fluid when the corresponding valve 29 is open, and a controller 32 to open and close the valve 29. For example, in one embodiment, the mixer 26 includes five forming plates 28, five valves 29, and five distribution lines 30, and the controller 32 includes a memory (not shown) and a processor (not shown) to allow one to input data to control when and how long each valve 29 is open, and the pressure of the air supplied to the valves 29. In some embodiments, valves 29 and controller 32 are located in the same enclosure.

Figure 7:
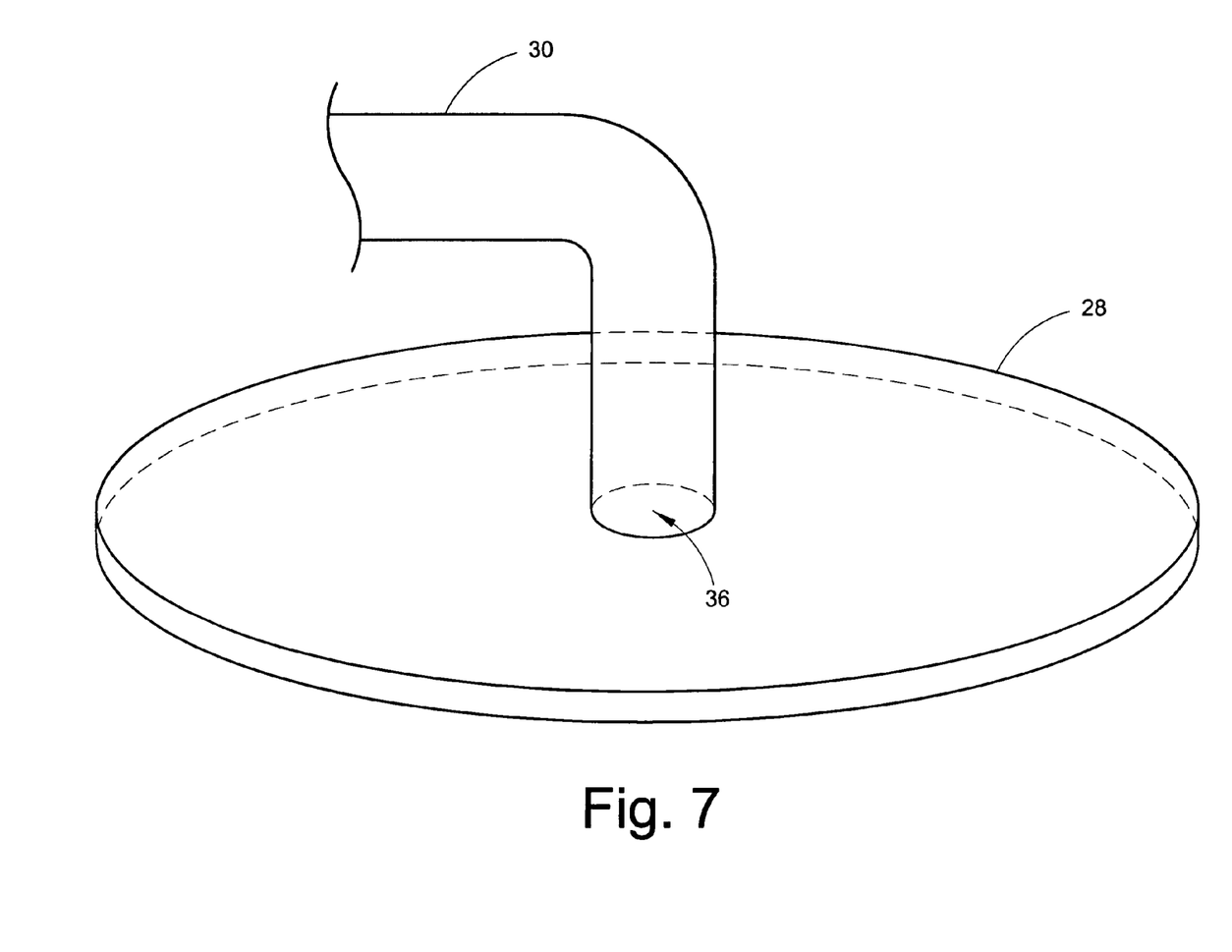
FIG. 7 depicts one embodiment of a plate for forming large mixing bubbles according to an embodiment of the invention.

Each forming plate 28, one embodiment of which is shown in FIG. 7, includes an orifice 36. When the valve 29 is opened, air flows through the distribution line 30 toward the forming plate 28, and then exits the distribution line 30 through the orifice 36. The forming plate 28 prevents the air from rising toward the surface of the wastewater until the valve 29 injects more air than the forming plate 28 can hold, at which time most of the air escapes from under the forming plate 28 and forms a large mixing bubble. The large mixing bubble then rises toward the surface of the wastewater. When the valve 29 is closed, air does not flow through the orifice 36. Detail of an exemplary forming plate is shown in FIG. 7, illustrating forming plate 28, with distribution line 30 terminating in orifice 36.

For additional discussion on the forming plate 28 and an embodiment of an injector see U.S. Pat. No. 6,629,773, titled IMPROVED METHOD AND APPARATUS FOR GAS INDUCED MIXING AND BLENDING OF FLUIDS AND OTHER MATERIALS, issued to Parks on 7 Oct. 2003, which is herein incorporated in its entirety. For additional discussion on the controller 32 see PCT Patent Application PCT/US2004/011248, titled APPARATUS AND METHOD FOR GAS INDUCED MIXING AND AGITATING OF A FERMENTING JUICE IN A TANK DURING VINIFICATION, filed 8 Apr. 2004, which is also herein incorporated in its entirety.

As will be understood by those of skill in the art, a wide variety of means may be used to generate the large mixing bubbles of the present invention. For example, instead of employing the forming plate 28 discussed hereinabove, embodiments of the invention may employ a means of accumulating a large volume of gas and periodically releasing it in quantity through a single large orifice to generate the requisite large mixing bubbles. As will be appreciated by those in the art, the present invention is not limited to any particular such means, but rather encompasses all such means for generation of large mixing bubbles.

Still referring to FIG. 2, the forming plates 32 may be arranged throughout the aerobic zone 20a as desired to provide any desired mixing current arrangement. In one embodiment, the forming plates 32 are spatially located a few inches above the bottom of the tank 18 in the zone 20a. The forming plates 32 each may be located closer to the bottom of the tank 18 in zone 20a or further away from the bottom of the tank 18. Preferred embodiments employ one or more forming plates 32 located on the bottom of tank 18 or at most a few inches above the bottom, in order to maximize the efficacy of the mixing afforded by the large bubbles.

Figure 5:
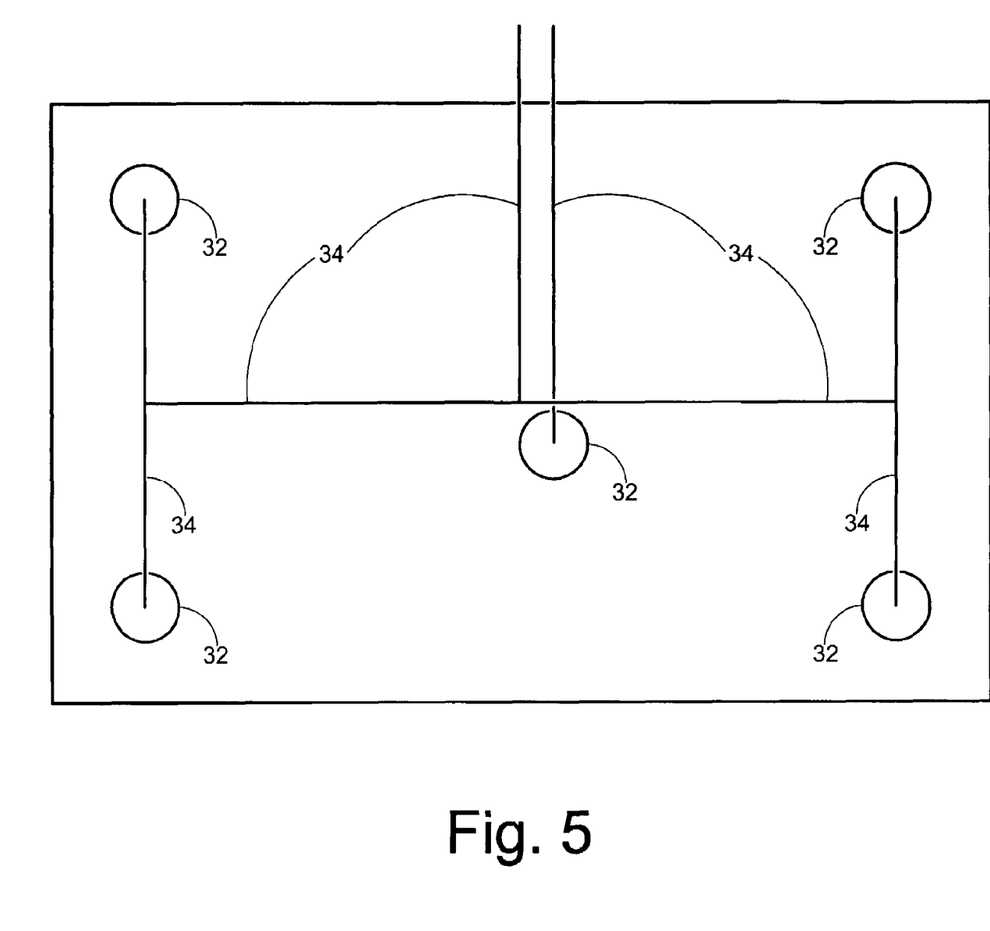
FIG. 5 is a view of distribution lines and forming plates located and arranged in a tank, according to another embodiment of the invention.
Figure 6:
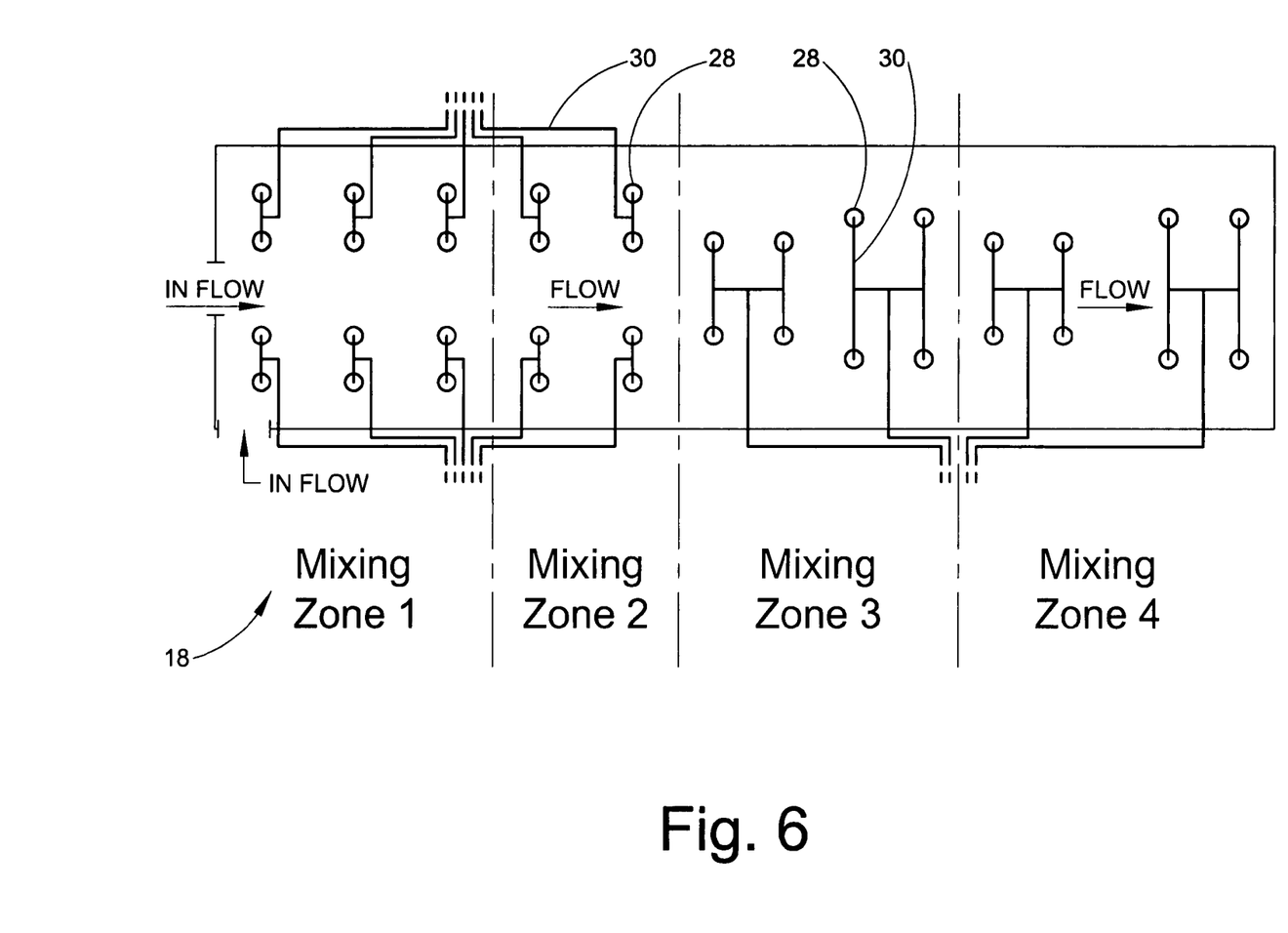
FIG. 6 is a view of distribution lines and forming plates located and arranged in a tank, according to yet another embodiment of the invention.

In the depicted embodiment, the forming plates 32 are spatially arranged in the zone 20a to form a rectangle. Numerous other spatial arrangements of the plates 32 are possible, such as that shown in the zone 20b. In still other embodiments, the forming plates 32 may be arranged as shown in FIGS. 5 and 6. FIG. 5 shows a preferred embodiment, in which supply lines 34 are provided for five plates 32 in arrangement providing one of four plates 32 on each of the corners of a square and one plate 32 in the center of the square. FIG. 6 shows an alternative embodiment.

The region of the tank occupied by the forming plates 32 may vary, depending upon tank configuration and wastewater treatment requirements, from less than 25 square feet to more than 100 square feet.

Returning to FIG. 2, the valves 29 may also be opened and closed in any desired sequence to provide any desired mixing current. For example, in one embodiment, four valves 29 that correspond to the four forming plates 28 that are closest to the sidewalls of the tank 18 may first permit air to flow toward the forming plates 28. Then, after these valves 29 have closed, the remaining valves 29 corresponding to the remaining forming plates 28 may permit air to flow toward the forming plates 28. This sequence would cause a turbulence in the mixing currents generated by the four forming plates 28 and may promote mixing the wastewater, bacteria and other microorganisms through out the anoxic zone 20b.

Figure 3:
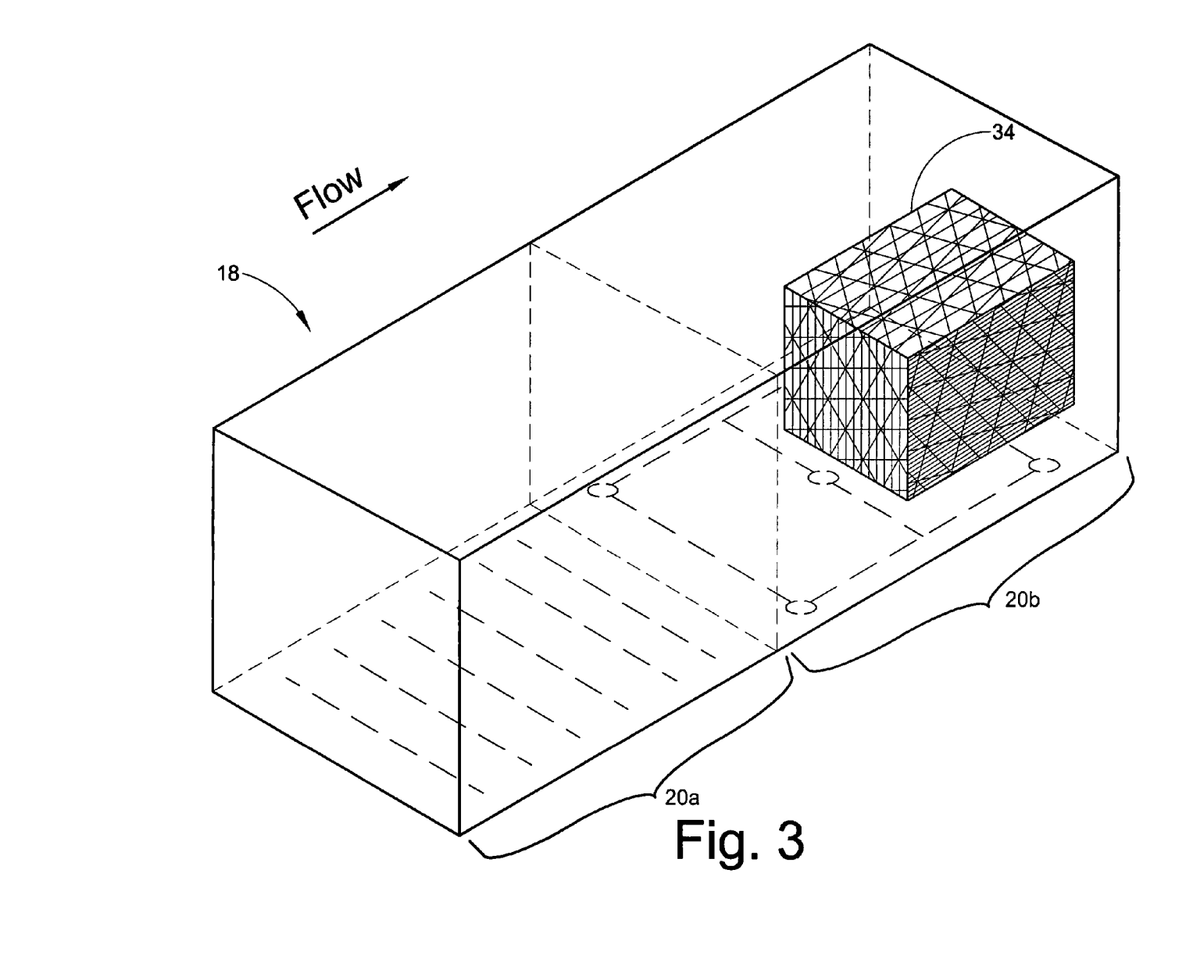
FIG. 3 is a perspective view of a tank such as that depicted in FIG. 2, further comprising an Integrated Fixed-film Activating Sludge (IFAS) system.

Referring now to FIG. 3, tank 18 may further contain a physical substrate for bioactivity, such as an Integrated Fixed-film Activating Sludge (IFAS) system 34 that includes media in the zone 20b. An IFAS is placed or suspended in the wastewater and provides bacteria and other microorganisms (not shown) a structure to hold onto. In other embodiments, the substrate may comprise a net or web (not shown) that is suspended by anchoring in the zone 20b to provide bacteria and other microorganisms a structure to hold onto. In still other embodiments, an IFAS may include both the net or web and the media.

Figure 4:
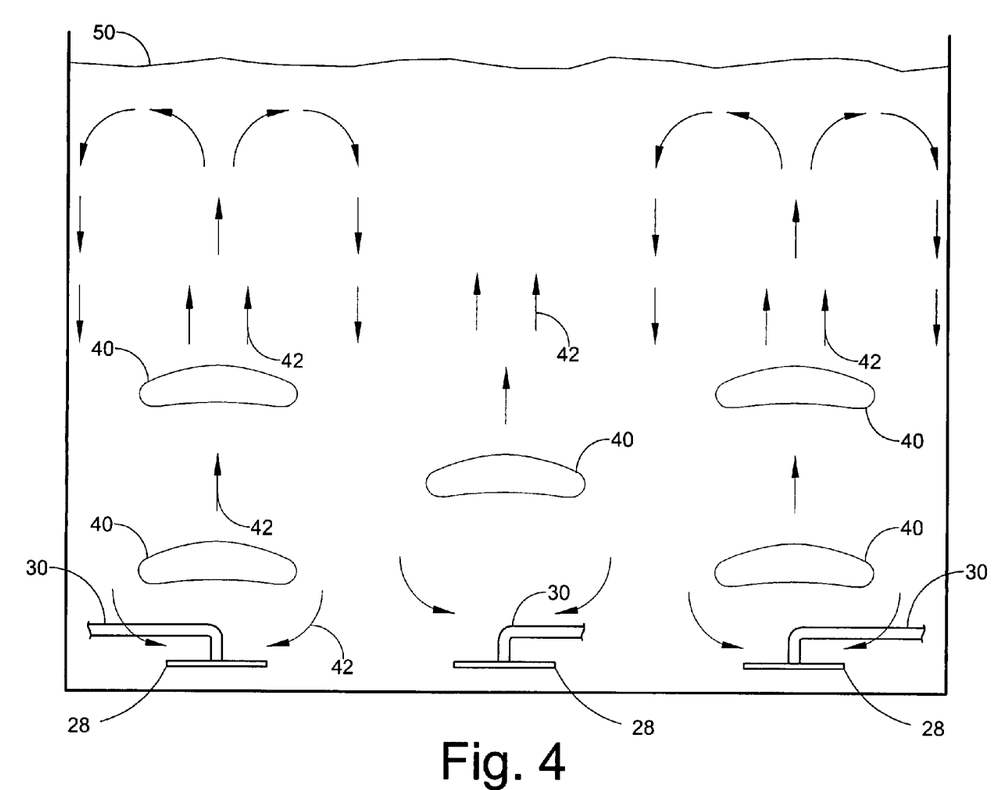
FIG. 4 is a view of the anoxic portion in FIGS. 2 and 3, illustrating the mixing currents generated by large mixing bubbles.

FIG. 4 is a view of the anoxic portion in FIG. 2. The mixing bubbles 40 generate the mixing currents indicated by the arrows 42 (28 arrows shown but only 5 labeled with the reference number 42 for clarity) that mix the wastewater 50, bacteria (omitted for clarity) and other microorganisms (also omitted for clarity). The strength of the mixing currents depends on the speed at which each mixing bubble 40 travels through the wastewater and the size of each bubble 40.

The speed of the mixing bubble 40 depends on the density of the fluid relative to the density of the wastewater 50, and the bubble's shape. The greater the difference between the den sities of the wastewater 50 and the fluid, the faster the mixing bubbles 40 rise through the wastewater 50. The more aerodynamic the shape of the bubble 40 becomes the faster the bubble 40 rises through the wastewater 50. For example, in one embodiment, the bubble 40 forms a squished sphere—a sphere whose dimension in the vertical direction is less than the dimension in the horizontal direction. In other embodiments, the bubble 40 forms a squished sphere having the trailing surface—the surface of the bubble 40 that is the rear of the bubble 40 relative to the direction-the bubble 40 moves—that is convex when viewed from the direction that the bubble 40 moves. The size of the mixing bubble 40 depends on the flow rate of the fluid into the wastewater 50. The flow rate depends on the size of the orifice 36 and the fluid's injection pressure. As one increases the fluid injection pressure, one increases the amount of fluid injected into the wastewater 50 over a specific period of time that the valve 29 is open. And, as one increases the area of the orifice 36, one increases the amount of fluid injected into the wastewater 50 over a specific period of time that the valve 29 is open. As one increases the diameter of the forming plate 28 one increases the amount of fluid the forming plate 28 can hold before the fluid escapes it. For example, in one embodiment the size of the bubble 40 is approximately 6 inches across its largest dimension. In other embodiments, the bubble 40 is approximately 10 feet across in largest dimension.

Although the detailed descriptions above contain many specifics, these should not be construed as limiting the scope of the invention but as merely providing illustrations of some of the presently preferred embodiments of this invention. Various other embodiments and ramifications are possible within its scope, a number of which are discussed in general terms above.

While the invention has been described with a certain degree of particularity, it should be recognized that elements thereof may be altered by persons skilled in the art without departing from the spirit and scope of the invention. Accordingly, the present invention is not intended to be limited to the specific forms set forth herein, but on the contrary, it is intended to cover such alternatives, modifications and equivalents as can be reasonably included within the scope of the invention. The invention is limited only by the following claims and their equivalents.

We claim:

1. A system for treatment of wastewater, comprising
   a tank containing at least one of an aerobic, an anoxic and an anaerobic wastewater treatment zone, such wastewater treatment zone having an upper portion and a lower portion;
   at least one physical substrate for bioactivity disposed in at least one wastewater treatment zone; and
   a means for generating large mixing bubbles of 6 inches or greater in diameter within the lower portion of at least one wastewater treatment zone that contains a physical substrate for bioactivity.

2. A system according to claim 1, wherein the means for generating large mixing bubbles comprises at least one bubble forming plate disposed in the lower portion of the wastewater treatment zone.

3. A system according to claim 2, wherein a plurality of bubble forming plates are disposed throughout the lower portion of the wastewater treatment zone.

4. A system according to claim 1, wherein the physical substrate for bioactivity comprises an integrated fixed-film sludge activating system.

5. A system according to claim 1, wherein the physical substrate for bioactivity comprises a physical medium suspended within the wastewater treatment zone.

6. A system according to claim 5, wherein the physical medium comprises netting.

7. A method of wastewater treatment, comprising
   placing wastewater in a tank in which, in at least a portion thereof, is disposed at least one substrate for biological activity, and
   generating large bubbles of six inches or greater in diameter in the lower part of the tank in said portion of the tank,
   whereby the large bubbles mix the contents of the tank in said portion of the tank.

8. A tank for the treatment of wastewater, comprising
   an anoxic zone, having an upper and a lower portion;
   an aerobic zone, having an upper and a lower portion and characterized by the presence of a means for aerating wastewater disposed therein;
   a physical substrate for bioactivity disposed within at least one of the anoxic zone and the aerobic zone; and
   a means for generating large mixing bubbles of six inches or greater in diameter in the lower portion of a zone containing the physical substrate for bioactivity.

\* \* \* \* \*